Aug. 24, 1943.  W. J. FIEGEL  2,327,598
MACHINE FOR SIZING BEARINGS
Filed Nov. 29, 1939  8 Sheets-Sheet 1

INVENTOR.
WILLIAM J. FIEGEL
BY *Whittemore Hulbert & Belknap*
ATTORNEYS

Aug. 24, 1943.  W. J. FIEGEL  2,327,598
MACHINE FOR SIZING BEARINGS
Filed Nov. 29, 1939  8 Sheets-Sheet 2

INVENTOR.
WILLIAM J. FIEGEL
BY Whittemore Hulbert Belknap
ATTORNEYS

Aug. 24, 1943.   W. J. FIEGEL   2,327,598
MACHINE FOR SIZING BEARINGS
Filed Nov. 29, 1939   8 Sheets-Sheet 3
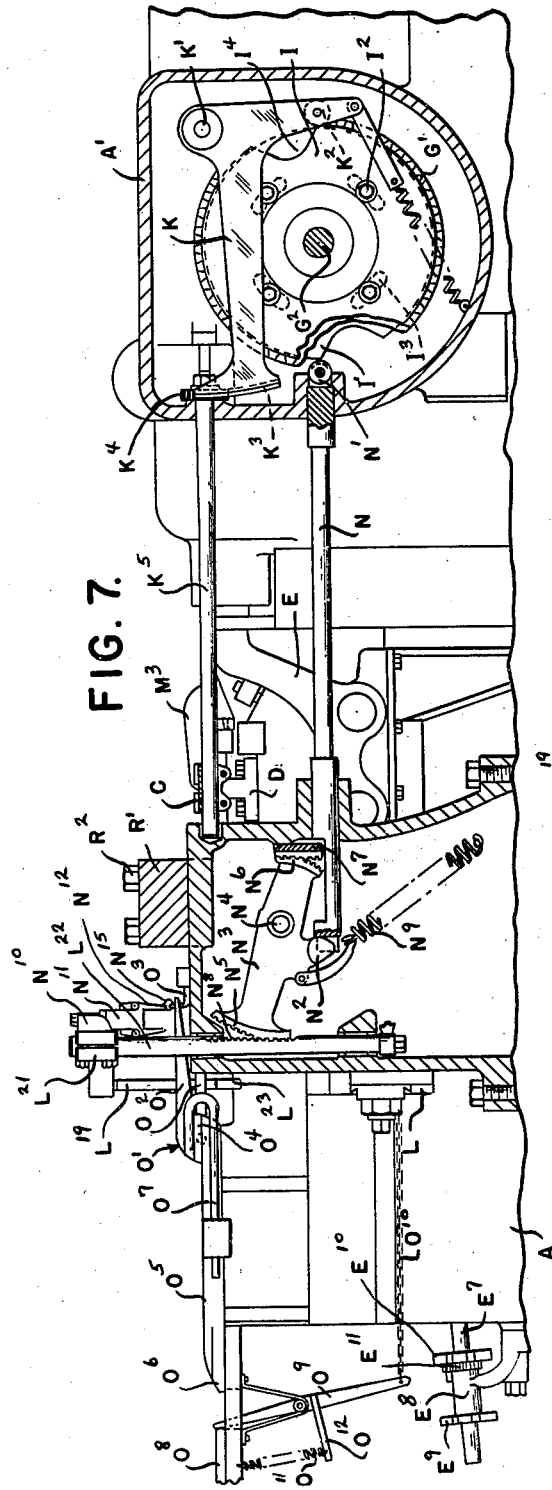
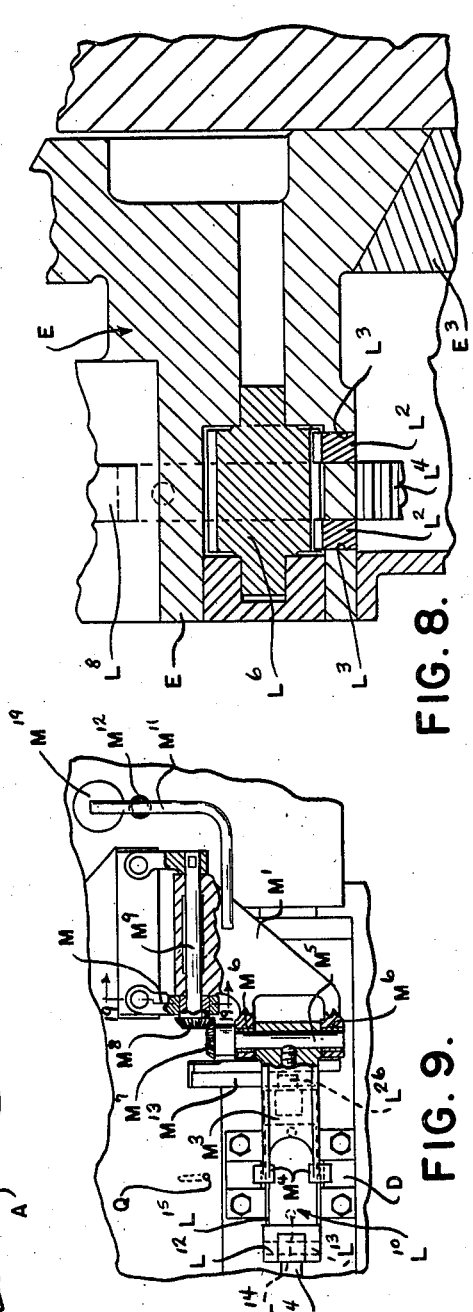
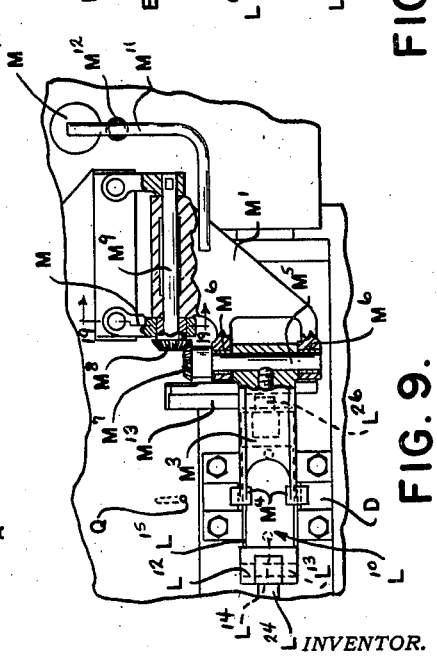
INVENTOR.
WILLIAM J. FIEGEL
ATTORNEYS Aug. 24, 1943.　　　W. J. FIEGEL　　　2,327,598
MACHINE FOR SIZING BEARINGS
Filed Nov. 29, 1939　　　8 Sheets-Sheet 4

INVENTOR.
WILLIAM J. FIEGEL
BY Whittemore Hulbert & Belknap
ATTORNEYS

Aug. 24, 1943.                W. J. FIEGEL                2,327,598
                       MACHINE FOR SIZING BEARINGS
                         Filed Nov. 29, 1939           8 Sheets-Sheet 5
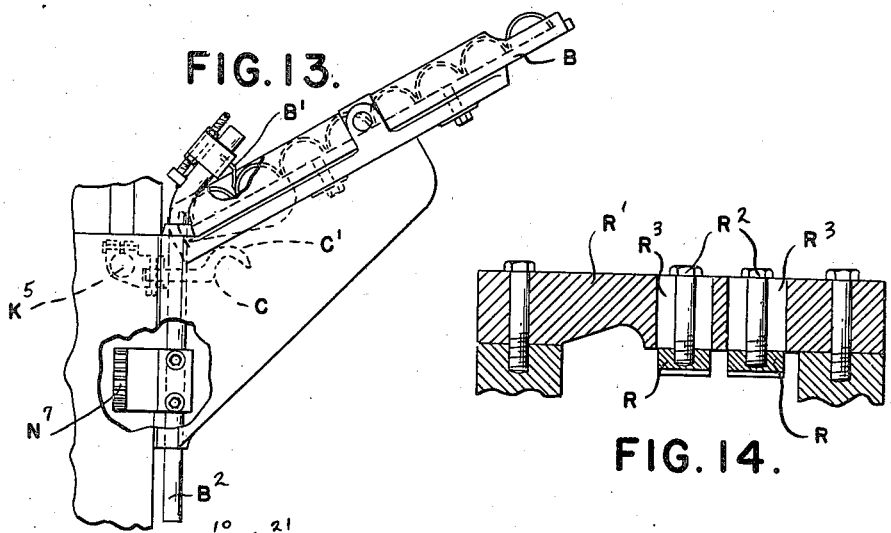
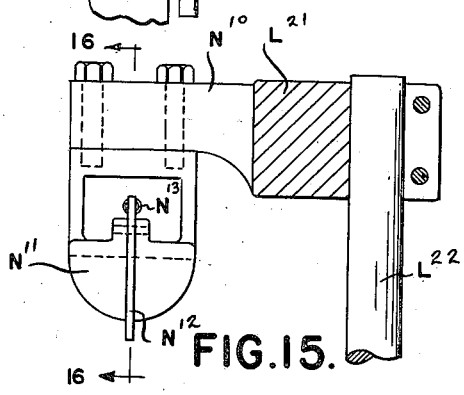
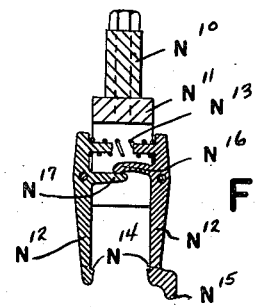
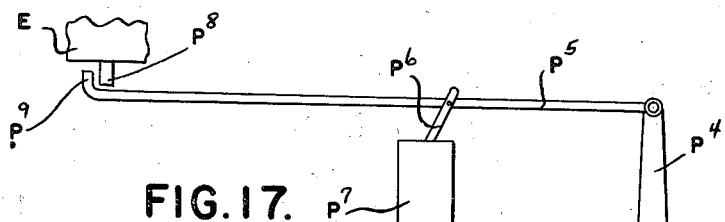
INVENTOR.
WILLIAM J. FIEGEL
BY Whittemore Hulbert + Belknap
ATTORNEYS

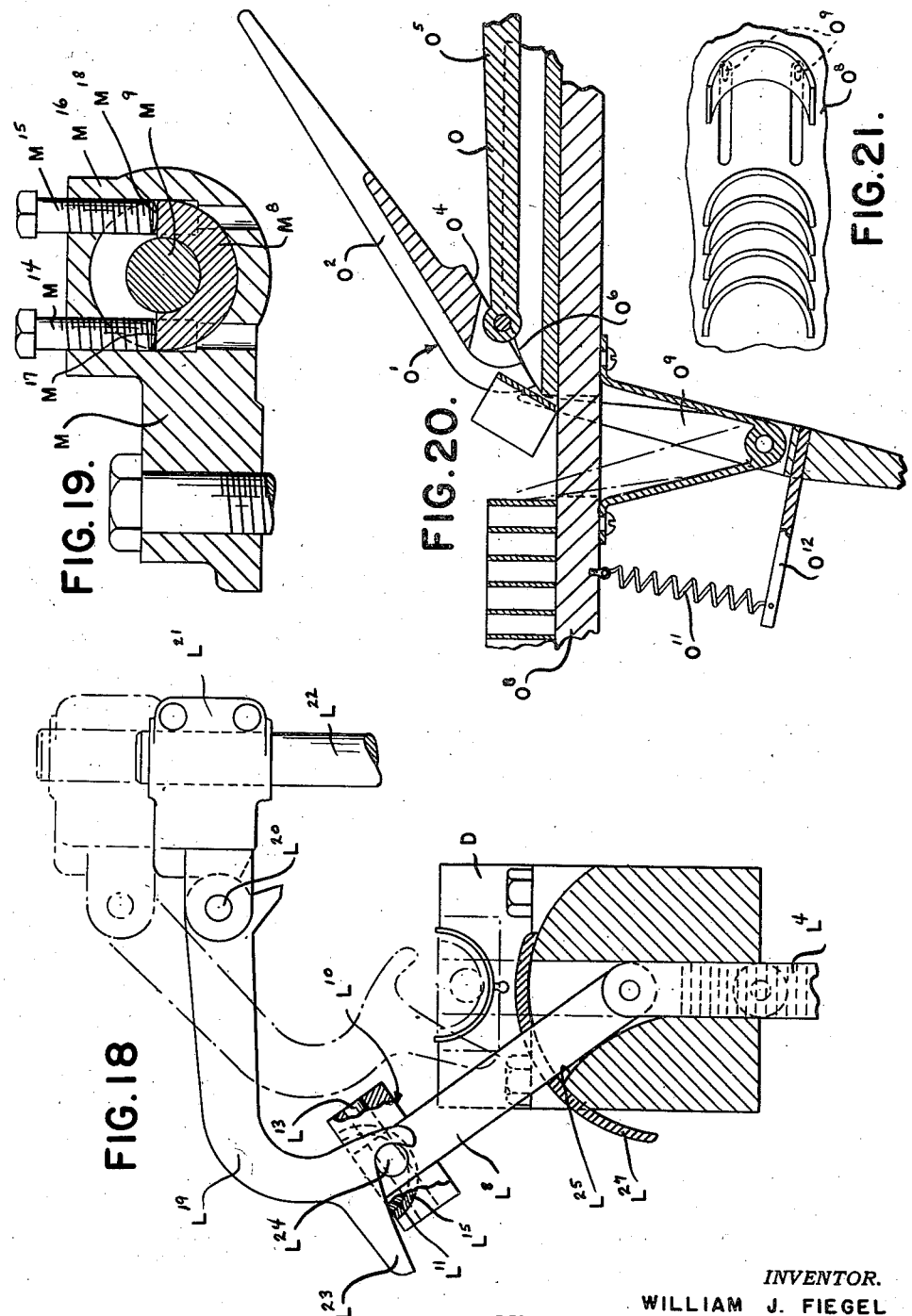

Aug. 24, 1943.  W. J. FIEGEL  2,327,598
MACHINE FOR SIZING BEARINGS
Filed Nov. 29, 1939  8 Sheets-Sheet 8

INVENTOR.
WILLIAM J. FIEGEL
BY Whittemore Hulbert & Belknap
ATTORNEYS

Patented Aug. 24, 1943

2,327,598

UNITED STATES PATENT OFFICE 2,327,598

MACHINE FOR SIZING BEARINGS

William J. Fiegel, Detroit, Mich., assignor to Bohn Aluminum & Brass Corporation, Detroit, Mich., a corporation of Michigan Application November 29, 1939, Serial No. 306,725

19 Claims. (Cl. 90—33)

The invention relates to machines for forming journal bearing liner segments and more particularly to a means for accurately sizing such segments so as to adapt the same for exchangeable use in journal bearings of predetermined dimensions. In the present state of the art it is usual to provide journal boxes or bearings with exchangeable segmental liners, which form the actual bearing surface. These liners are formed of various materials and by various methods, but before they can be used must be accurately sized. It is also customary to form such bearing liners of an original diameter somewhat in excess of the dimension they assume when placed in the bearing, so that the resiliency of the material will tend to hold the liner in close contact with the surrounding supporting structure. Thus, if the liner segments as originally formed are approximately one-half the circumference of a circle, their longitudinal edges must be trimmed to size each segment to a bearing of smaller radius. Great accuracy in this sizing is required, as otherwise the liners might be either too loose which is objectionable, or too tight to cause a pinching of the journal.

It is the object of the instant invention to provide a machine which will automatically operate with great rapidity on liner segments as originally formed, accurately sizing and then delivering the same. To this end, the invention consists in the novel construction of the organized machine, and further in the novel construction of various portions of the mechanism for performing unique functions, as hereinafter set forth.

In the drawings:

Figure 7 is a longitudinal section on line 7—7 of Figure 3;

Figure 8 is an enlarged cross section on line 8—8 of Figure 4;

Figure 9 is a sectional plan view, showing the leveling mechanism;

Figure 13 is an enlarged elevation of a portion of Figure 3, showing the feed chute;

Figure 14 is a cross section on line 14—14 of Figure 5;

Figure 15 is a cross section on line 15—15 of Figure 1;

Figure 16 is a section on line 16—16 of Figure 15;

Figure 17 is a diagrammatic elevation showing the valve actuating mechanism for controlling the air cylinder;

Figure 18 is an enlarged section substantially on line 18—18 of Figure 2;

Figure 19 is a section on line 19—19 of Figure 9;

Figure 20 is an enlarged sectional view of a portion of Figure 7, showing the mechanism for stacking the completed bearing segments;

Figure 21 is a plan view of a portion of Figure 20;

General organization of the machine

Figure 4:
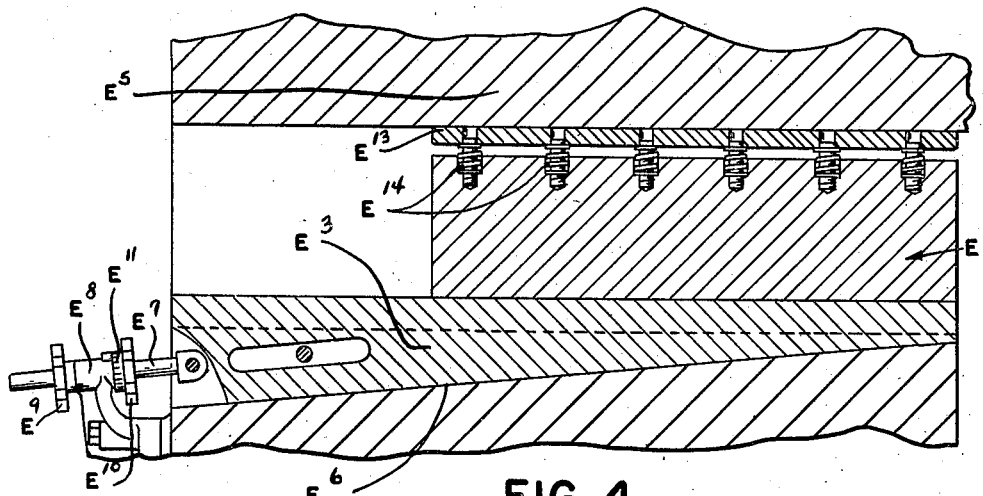
Figure 4 is a vertical longitudinal section on line 4—4 of Figure 3, showing a portion of the carriage, its guideway and the adjusting means therefor.
Figure 5:
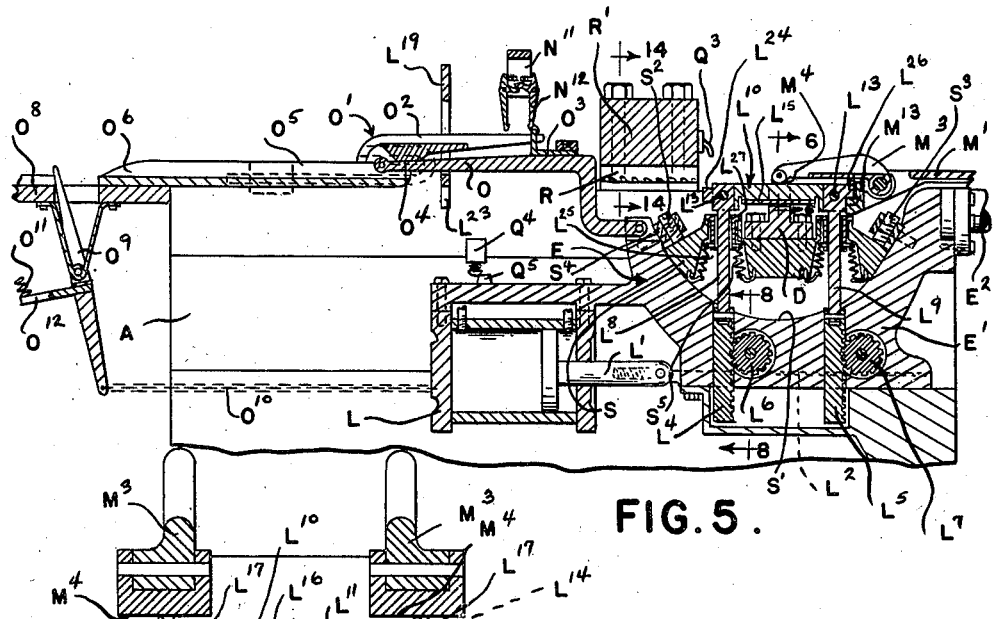
Figure 5 is a similar section on line 5—5 of Figure 3.
Figure 6:
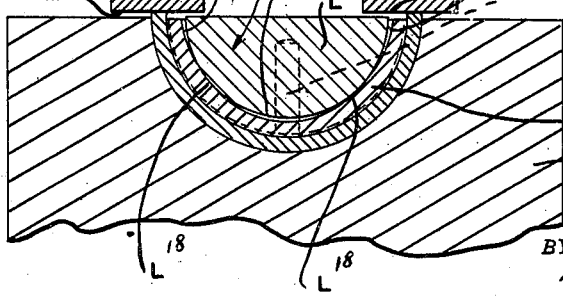
Figure 6 is a cross section through the work holder on the carriage.
Figure 10:
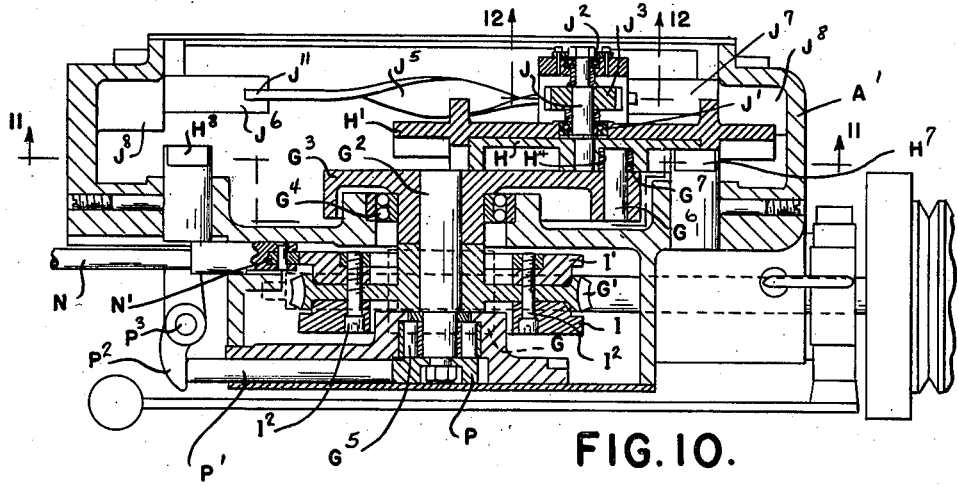
Figure 10 is a horizontal section on line 10—10 of Figure 1.
Figure 22:
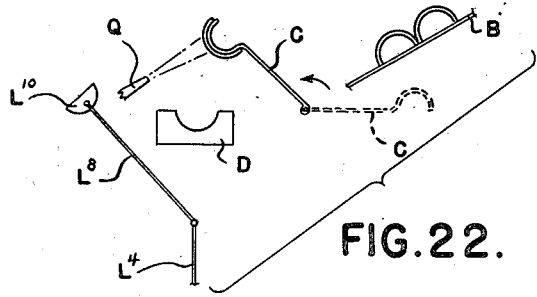
Figures 22 to 32 are diagrams illustrating the successive operations of the mechanism in the performance of the work by the machine.
Figure 23:
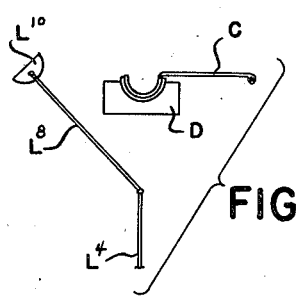
Figure 24:
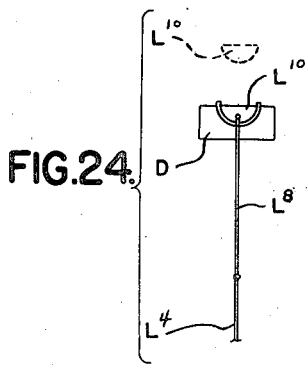
Figure 25:
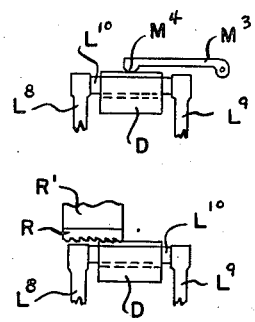
Figure 26:
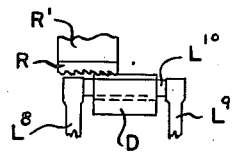
Figure 27:
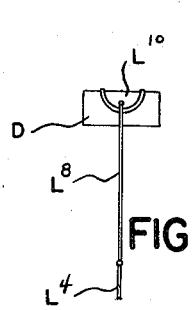
Figure 28:
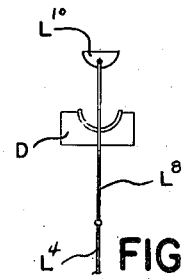
Figure 30:
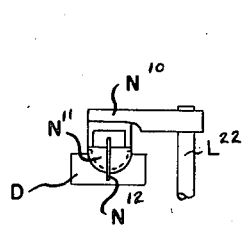
Figure 31:
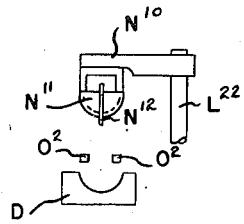
Figure 32:
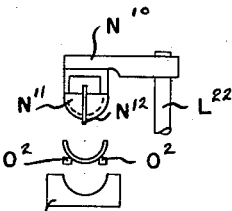
Figures 33, 34:
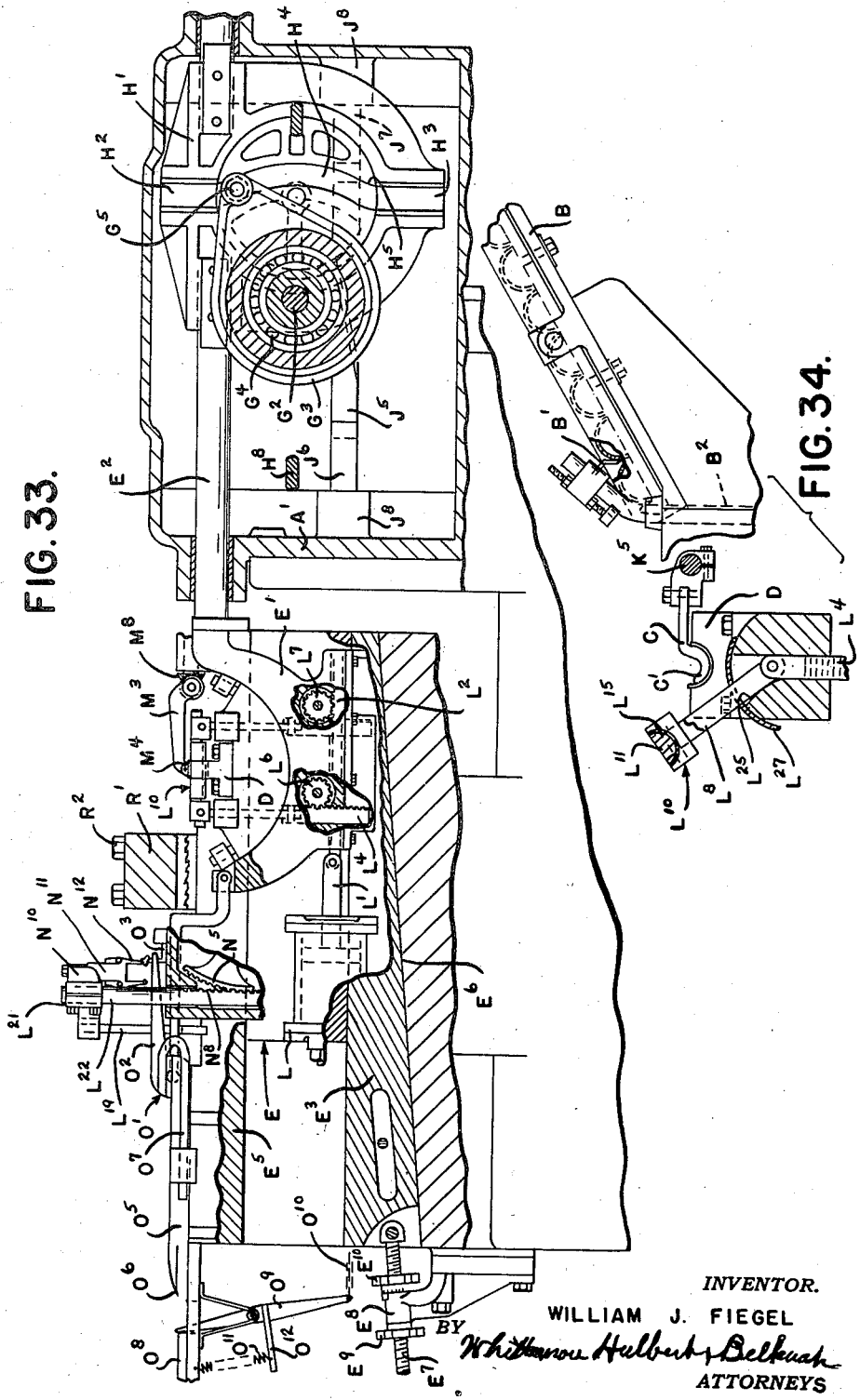
Figure 33 is a longitudinal sectional elevation illustrating the mechanism, portions of which are separately shown in Figures 4, 5 and 11.
Figure 34 is a cross section in the plane of the loader, illustrating the same in connection with the feed chute, the work holding die, and the clamping mechanism.

My improved machine as a unit comprises a suitable supporting frame A on which is mounted an inclined chute or guide B for receiving the unsized segments and successively delivering them to the operating mechanism. This mechanism includes a loader C (Figs. 1, 2, 13 and 22) for transferring a liner segment from the chute B to a female die or work holder D, the latter being of a radius corresponding to the external diameter of the finished liner when in use. The die D (Figs. 1, 5, 6, 22–32) is mounted upon a carriage E, which in turn is mounted for longitudinal reciprocation on the frame A (Figs. 4 and 5). The reciprocating mechanism (Figs. 10, 11 and 12) is of a character to impart a slightly modified harmonic movement to the carriage, but with a dwell at each end of the movement during which other functions are performed. The functions performed at one end are: first, the operation of the loader as above described (Fig. 22); second, the insertion of a core into the segment within the die (Fig. 24); third, the leveling of the edges of the segment to be in the same plane (Figs. 5, 6 and 25); and fourth, the clamping of the segment in the die by the core (Figs. 6 and 24). During the forward reciprocation of the carriage the die with the clamped segment therein, is passed beneath a cutter which trims the longitudinal edges of the segment (Figs. 5 and 26). After the completion of this movement and during the period in which the carriage is stationary before return, the core is removed from the die (Figs. 18, 28 and 29) and the finished segment lifted out of the die to clear the same (Figs. 15, 16, 30 and 31). Thus, the carriage is free to be returned to the position for a new cycle, while the lifted segment is deposited on a conveyor for moving it out of the way of succeeding operations (Figs. 20, 21 and 32). There is also provision for cleaning the die from any chips or dust deposited thereon (Figs. 1 and 2), as well as means for cleaning the segment from dust or dirt before its insertion in the die by the loader (Figs. 5 and 22).

*Work holding carriage and reciprocating mechanism therefor*

The carriage E (Figs. 1 and 5) includes a frame member E' and a rearwardly extending rod $E^2$. The latter extends into a housing A' (Figs. 10 and 11) on the frame A, which encloses the reciprocating mechanism constructed as follows. F is a driving shaft receiving its power from a motor through the medium of a clutch F' controlled by a starting lever $F^2$. Mounted on the shaft F is a worm G for engaging a worm gear G' on a shaft $G^2$, which also carries a crank $G^3$ and is supported in bearings $G^4$ and $G^5$. The crank pin $G^6$ having a roller sleeve $G^7$ engages a channel track in a member H and an extension of said channel track in a member H'. The latter member is mounted upon and depends from the rod $E^2$ and is recessed to revolubly receive the member H. As will be later described, the member H is given a half revolution during the reciprocatory movement of the carriage E, but while said carriage is at rest the members H and H' are stationary in relation to each other. The channel which receives the crank pin $G^6$ and roller sleeve $G^7$ includes portions $H^2$ and $H^3$ in the member H', which are perpendicular to the axis of the shaft $E^2$, and the portion $H^4$ in the member H, which is of arcuate form and concentric to the axis of the shaft $G^2$. Thus, during the rotation of the crank $G^3$ no movement will be imparted to the members H, H' and the carriage E, while the crank pin is in engagement with the arcuate portion $H^4$ of the channel. On the other hand, when the crank pin engages the portion $H^2$ of the channel forward movement will be imparted to the carriage, and when the pin is in engagement with the portion $H^3$ of the channel rearward movement will be imparted to the carriage. It will be evident that if the members H and H' always remained in stationary relation to each other, then a non-symmetrical movement would be imparted to the carriage. This is for the reason that the arcuate portion $H^4$ would only be concentric with the axis of the shaft $G^2$ while the member H is in its initial position. Thus, in the continued movement of the crank pin, after passing its upper dead center and traveling downward to the limit of the channel portion $H^2$, it would engage the channel $H^4$ while non-concentric with the axis of the shaft $G^2$, imparting to the member H an oscillatory movement instead of holding said member stationary. I have avoided such result by rotating the member H through one-half revolution during the interval in which the crank pin is engaged with the channel portion $H^2$ which brings the arcuate channel portion $H^4$ again concentric with the axis of the shaft $G^2$ when the carriage is at the end of its forward movement. Consequently, the carriage will dwell at this point during the interval required for the movement of the crank pin through the channel $H^4$ into the channel portion $H^3$. In the same manner during the return movement of the carriage, the member H is again revolved through a half revolution to return the arcuate channel portion $H^4$ to its original position before it is again engaged by the crank pin.

Various specific mechanisms might be used for accomplishing the movements just described, but I preferably use the following construction. J (Figs. 10 and 12) is a shaft on which the member H is mounted and which is journaled in bearings J', $J^2$ in the member H'. $J^3$ is a spiral gear mounted on the shaft J intermediate said bearings, which gear is in mesh with a corresponding spiral gear $J^4$ having its axis at right angles to the axis of the shaft J. The gear $J^4$ is slidably mounted on a guideway $J^5$, the intermediate portion of which is twisted through one-half revolution. The guideway $J^5$ is mounted in the housing A' to have its axis parallel to the direction of movement of the shaft $E^2$. This mounting includes a pair of shafts $J^6$ and $J^7$ engaging bearings $J^8$ in the housing and keyed thereto to be held from rotation. Axial recesses $J^9$ are formed in these shafts to receive pintles $J^{10}$ on the ends of the guideway $J^5$, while transverse slots $J^{11}$ in said shafts receive the ends of the guide, which is of oblong cross-section, and hold it from turning. The total effect of the construction above described is to impart a reciprocatory movement to the carriage E with equal periods of dwell at the opposite ends of its movement. In order, however, to avoid too great an acceleration when the crank passes from the arcuate portion $H^4$ into either of the portions $H^2$ or $H^3$, I preferably terminate the portion $H^4$ with reverse tangent curved portions $H^5$ and $H^6$. These will impart an initial movement to the carriage, which is of the character of a slightly modified harmonic movement.

To assure the accurate registration of the track portions in the member H' with those in the member H and also to hold the member H' rigid while the crank pin $G^6$ is in engagement therewith, I have provided the following construction. $H^7$ and $H^8$ are key members preferably formed at the ends of pins which are rigidly secured in a portion of the housing A'. These key members are so positioned as to engage the members H and H' respectively, at the ends of the forward and rearward movements thereof, said members being provided with recesses for fitting the keys. Inasmuch as the rotation of the member H' is completed before the completion of a reciprocatory movement of the members H and H', the key receiving recesses in said members will be in approximate registration with each other and the keys. However, the unavoidable clearances in the gearing might leave the member H' slightly out of registration and this is corrected by the insertion of the key which also holds it rigid with the frame. By slightly chamfering the recess in the member H' the key will enter the same even where there is a slight misalignment.

The carriage E is guided during its reciprocatory movement by guideways $E^3$, $E^4$ and $E^5$ (Figs. 3 and 4) on the frame A. Provision is also made for a slight vertical adjustment of the supporting way $E^3$ for the purpose of adjusting the work on the carriage in relation to the cutting tool. Such adjustment is accomplished by forming the way $E^3$ with a longitudinally inclined lower surface $E^6$ engaging a corresponding inclined bearing on the frame A. A screw threaded linked rod $E^7$ at the end of the way $E^3$ passes through a bearing $E^8$ on the frame and threaded collars $E^9$ and $E^{10}$ on opposite sides of said bearing serve as an adjustment means. One of these collars may be calibrated as shown at $E^{11}$, so as to indicate the exact amount that the carriage will be raised in the rotative adjustment of the collar. A clamping plate $E^{12}$ holds the way $E^3$ rigid after each adjustment. To permit of vertical movement of the carriage when the way $E^3$ is adjusted, a shoe $E^{13}$ extending along the upper face of the frame E' is yieldably pressed against the bearing $E^5$ by springs $E^{14}$. The ways $E^3$ and $E^5$ are preferably obliquely inclined in cross section. This will hold the carriage frame E' in close contact with the vertically extending way $E^4$ at its upper end and a vertical way $E^{15}$ at its lower end, thereby insuring a very accurate movement of the carriage along a predetermined path.

Loading mechanism

Figure 1:
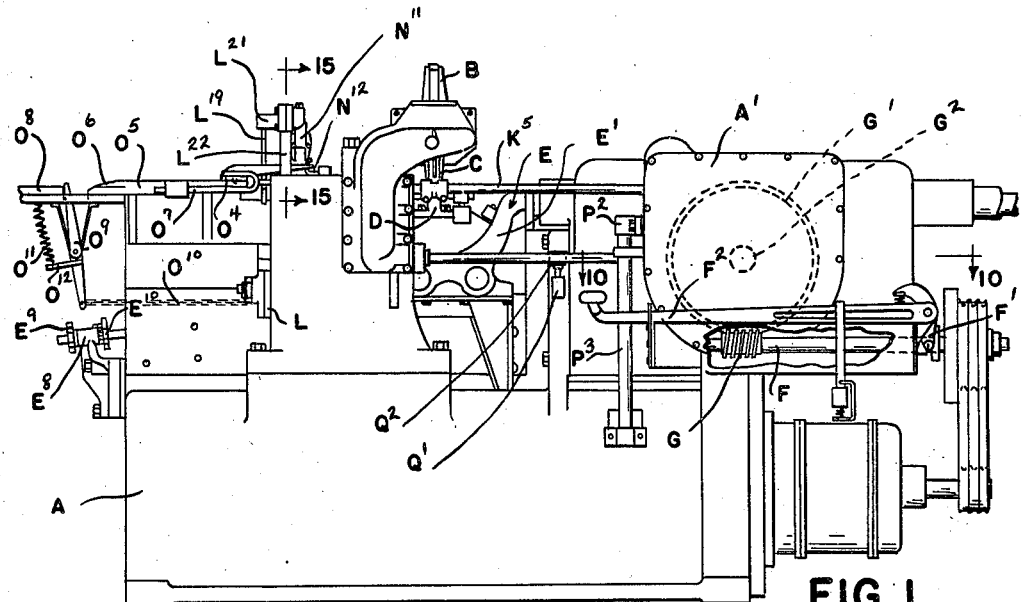
Figure 1 is a side elevation of the machine.
Figure 2:
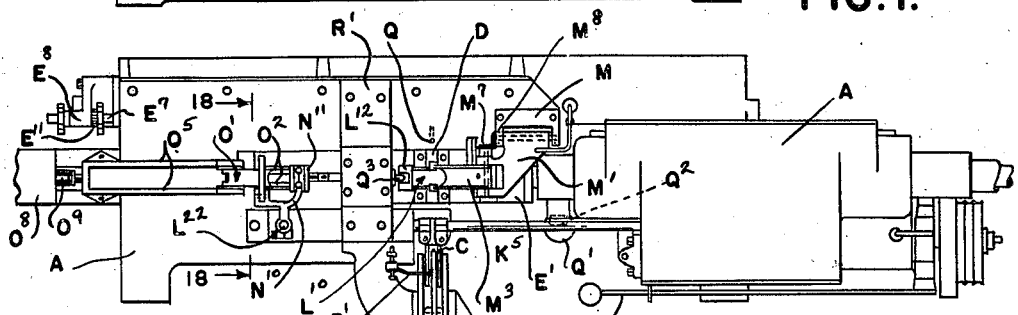
Figure 2 is a plan view thereof.
Figure 3:
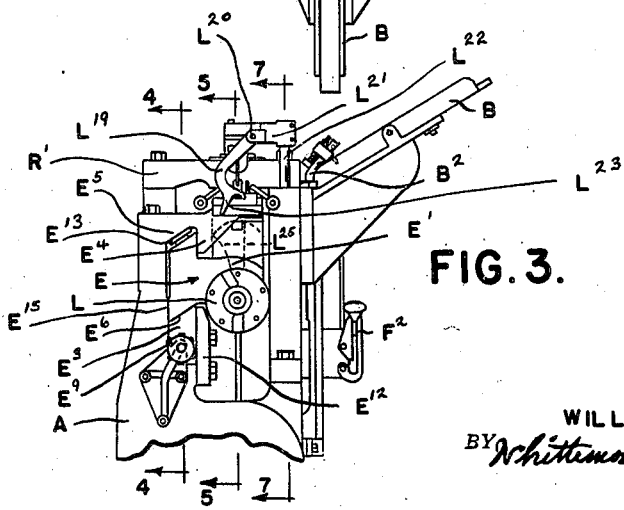
Figure 3 is an end elevation.

The worm gear wheel G' (Fig. 10) has mounted upon opposite sides thereof cam members I and I', preferably clamped thereto by bolts $I^2$ passing through slots $I^3$ in the web of the wheel. This permits of a slight rotative adjustment of the cams for proper timing of the same. The cam I (Fig. 7) actuates a bell crank lever K, which is fulcrumed on a pin K' and has a roller $K^2$ peripherally engaging the cam. The other arm of the bell crank lever terminates in a rack $K^3$ in mesh with a pinion $K^4$ on a shaft $K^5$ (Figs. 1, 2 and 7). This shaft has secured thereto a rock arm forming the loader C (Fig. 13), the outer end of said arm having a curved portion C' for engaging the lowermost liner segment in the chute B (Fig. 22). The parts are so constructed and positioned that at a predetermined time the roller $K^2$ following a depressed portion $I^4$ in the cam I will cause an upward movement of the rack $K^3$, rotating the pinion $K^4$ and shaft $K^5$ and swinging the arm C to carry a liner segment from the chute into engagement with the female die D. Upon completion of this transfer the arm is immediately returned to get it out of the way of other parts of the mechanism. To permit of this return movement without interference with the bearing segments in the chute B, these are temporarily held from downward movement in the chute by a detent B' (Figs. 3 and 13). This is secured to a vertical movable post $B^2$, which is actuated at properly timed intervals by mechanism to be described later.

Core actuating mechanism

During the loading operation just described it is of course essential that there should be no obstruction to the path of movement of the loader above the female die. Consequently, the core member subsequently used for clamping the liner segment must be removed from this path. This is accomplished by the following mechanism.

Mounted on the carriage E to travel therewith is an air cylinder L (Fig. 5), the piston of which is coupled by a rod L' with a rack $L^2$ horizontally slidable in a guideway $L^3$. The rack $L^2$ is preferably formed of two laterally spaced members between which are vertically extending racks $L^4$ and $L^5$, also suitably guided. $L^6$ and $L^7$ are pinions which are journaled in the carriage E and are positioned to be in mesh respectively with the racks $L^4$ and $L^5$ and also are of a length to be in mesh with both spaced members of the rack $L^2$. Thus, the horizontal movement of the rack $L^2$ under the actuation of the piston will be converted into vertical movement of the racks $L^4$ and $L^5$. To the upper ends of the racks $L^4$ and $L^5$ are pivotally connected links $L^8$ and $L^9$ while the upper ends of the links are coupled to the opposite ends of a core member $L^{10}$ (Figs. 5, 6, 22 and 24). This core member has a semi-cylindrical body portion $L^{11}$ for insertion within the bearing segment when engaged with the female die member D. At opposite ends of this central portion the member has bifurcated portions $L^{12}$ for receiving between the furcations thereof the ends of the links $L^8$ and $L^9$ being connected thereto by pins $L^{13}$. The central body portion $L^{11}$ has attached thereto by screws $L^{14}$ a semi-cylindrical resilient sleeve $L^{15}$. The latter is sufficiently yieldable and resilient to conform itself to the inner surface of the bearing segment and to compensate for any slight variation in the thickness thereof. This is facilitated by relieving the inner surface of the sleeve centrally at $L^{16}$, and in its end portions at $L^{17}$ so as to leave intermediate bearing portions $L^{18}$ of only limited area. The screws $L^{14}$ are located at the opposite ends of the sleeve, so as to be beyond the ends of the female die.

When the racks $L^4$ and $L^5$ are drawn downward into their lowermost position, this through the links $L^8$ and $L^9$ will draw down the core member, thereby clamping the bearing segment in the female die. When, however, the racks $L^4$ and $L^5$ are moved upward the core will be lifted out of the female die and must then be moved laterally so as to clear the die for the removal of the bearing segment. This lateral movement is accomplished by a swinging arm $L^{19}$ (Figs. 1, 3 and 18) which is pivoted at $L^{20}$ to a bracket bearing $L^{21}$ at the upper end of a vertically movable post $L^{22}$ actuated by means hereinafter described. The arm $L^{19}$ has a forked lower end $L^{23}$ which extends into the path of a pin $L^{24}$ projecting from the upper end of the link $L^8$. Thus, when the links $L^8$ and $L^9$ together with the core member attached thereto are moved upward by the racks $L^4$ and $L^5$ the pin $L^{24}$ will engage the fork $L^{23}$. At the same time the post $L^{22}$ will be moved downward, thereby causing the arm $L^{19}$ to swing rearward carrying with it the pin $L^{24}$, the links $L^8$ and $L^9$ and the core member $L^{10}$, so as to clear the die D. On the other hand, when the racks $L^4$ and $L^5$ are moved downward a cam $L^{25}$ (Fig. 18) engaging the rear side of the link $L^8$ will compel it to swing upward into a vertical position before it is sufficiently lowered to engage the core member with the die. This movement, however, occurs after the carriage has been returned to its initial position where the pin $L^{24}$ is out of registration with the swinging member $L^{19}$. A sliding cover $L^{27}$ shields the cam $L^{25}$ from dust and chips.

Leveling mechanism

In the operation of the loader C to transfer the bearing segment from the chute B to the die D the opposite edges of the segment may not be at the same level, or in other words, the segment may be slightly rotatively displaced in the die. This must be corrected before the clamping pressure is applied and is accomplished by the following construction. Mounted on the stationary frame is a bifurcated member M (Fig. 2) between the furcations of which is pivotally mounted a transversely swinging bracket member M'. The bracket member M' is also bifurcated to receive a longitudinally extending member $M^3$ (Figs. 2, 5, 6 and 9) bifurcated at its free end to form a pair of segmental bearing pads $M^4$. These are so positioned when the bracket member M' is swung forward that they will register with the edges of the bearing segment when the latter is engaged with the die D. However, during the loading of the die with the segment the member $M^3$ must be removed to avoid obstruction, and must be returned after the loader is out of the way to perform its leveling function in advance of the clamping. For accomplishing such movements the member M' is resiliently biased to swing to its clear position carrying the member $M^3$ with it and is moved to its forward position simultaneously with the movement of the core member $L^{10}$ which forms the actuating means therefor, the detailed construction being as follows.

The member $M^3$ is sleeved upon and keyed to a shaft $M^5$ which is journaled in bearings $M^6$ in the bracket member M'. On one end of this shaft $M^5$ is mounted a beveled gear wheel $M^7$ which intermeshes with a beveled gear wheel $M^8$ on a shaft $M^9$ forming the hinge pivot for the bracket member M'. The shaft $M^9$ together with the beveled gear wheel $M^8$ thereon is held from rotation so that when the bracket M' is swung upon said shaft the intermeshing beveled gear wheels will impart a rotary movement to the shaft $M^5$, thereby swinging the member $M^3$. The arrangement is such that in the retracted position of the bracket M' the arm $M^3$ is in angular relation thereto, but when the bracket M' is swung forward the arm $M^3$ is transversely swung so as to move it over and downward upon the die member D and edge portions of the bearing segment therein. Provision is made for a slight rotative adjustment of the gear wheel $M^8$ on its shaft $M^9$, and as shown this comprises adjusting screws $M^{14}$ and $M^{15}$ in a bearing $M^{16}$ engaging shoulders $M^{17}$ and $M^{18}$ on the hub of the beveled gear wheel $M^8$, so that by loosening one of said screws and tightening the other the gear will be rotatively adjusted.

It has been stated that the member M' is resiliently biased to move toward its retracted position and is actuated to its forward or operative position by the movement of the core member $M^{10}$. In detail, the resilient bias is produced by an arm $M^{11}$ (Fig. 9) projecting from the bracket member M', and a spring $M^{12}$ attached to said arm. A dash pot $M^{19}$ also attached to said arm checks the velocity of movement thereof under actuation of the spring. The forward movement is accomplished by a lug $L^{26}$ projecting rearward from the upper end of the link $L^9$, so that in the rearward movement of the carriage this lug will overlap the cam $M^{13}$ on the member M'. Thus, when the core member is actuated by the downward movement of the links $L^8$ and $L^9$ and through the cooperation of the cam $L^{25}$ is moved forward into registration with the die D, this same movement will through the lug $L_{26}$ swing the member M' forward and downward into position for the operation of the leveler. By rotatively adjusting the beveled gear wheel $M^8$ this movement is so timed that the leveling is completed before clamping pressure is applied through the core member to the segment in the die.

Unloading mechanism

As has been previously described, the work of sizing the liner or bearing segment is performed during the travel of the carriage forward from its initial position, so that at the completion of this movement the finished liner may be removed. The clamping core is first removed as previously described (Fig. 18), and is carried laterally to the rear of the die. Unloading is then accomplished by the following mechanism. The cam I' (Figs. 7 and 10) attached to the worm gear wheel G' is fashioned to operate at a certain point in its cycle a rod N, which is provided with a roller N' for engaging the periphery of the cam. The rod N is bifurcated at its rear end to embrace a bearing $N^2$ at the lower end of a rocker member $N^3$ pivoted at $N^4$ on the frame. At opposite ends of this rocker member are segmental gears $N^5$ and $N^6$, the radius of the former being greater than that of the latter. $N^7$ is a vertical rack engaging the gear segment $N^6$ which is secured to the vertically movable rod $B^2$ controlling the detent B' (Fig. 13), previously described. The gear segment $N^5$ engages a rack $N^8$ (Fig. 7) on the vertically movable post $L^{22}$ previously described. A spring $N^9$ connected by a link to the rockable member $N^3$ serves to return this member after its actuation by the rod N. The mechanism is so timed that the post $B^2$ together with the detent B' is lifted after the return of the loader C, so as to permit the bearing segments in the chute to slide downward, placing another segment in position for transfer. The post $B^2$ is then lowered, which causes the detent B' to hold all of the bearing segments above the lowermost one during a succeeding cycle. The timing is also such that the post $L^{22}$ is moved downward when the carriage is stationary at the end of its forward movement, but this downward movement is subsequent to the initial upward movement of the links $L^8$ and $L^9$ (Fig. 5) so that the core member clears the die before it is moved rearward, as previously described. The bracket member $L^{21}$ (Fig. 15) at the upper end of the post $L^{22}$ has an arm $N^{10}$ projecting therefrom, to which is attached the downwardly extending member $N^{11}$ bifurcated at its lower end and so positioned that during the descent of the post $L^{22}$, it will embrace the die member D. The furcations of the member $N^{11}$ are centrally slotted to receive pivotal levers $N^{12}$ (Fig. 16) having a spring $N^{13}$ extending between the upper ends thereof and latch hooks $N^{14}$ at their lower ends for engaging beneath the opposite ends of the bearing segment in the die member D. Consequently, when the post $L^{22}$ again rises, it will carry with it the bearing segment disengaging it from the die.

Stacking mechanism

Figure 11:
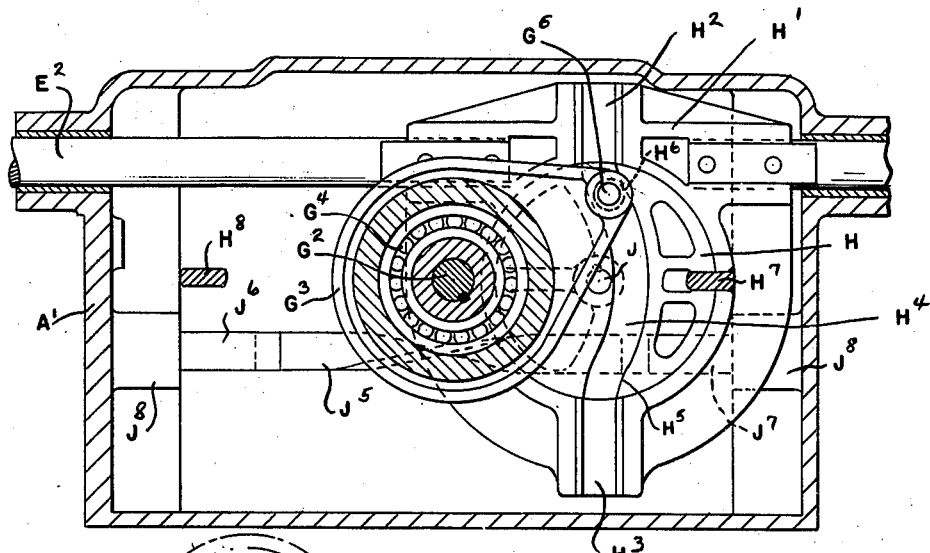
Figure 11 is a vertical longitudinal section on line 11—11 of Figure 10.
Figure 12:
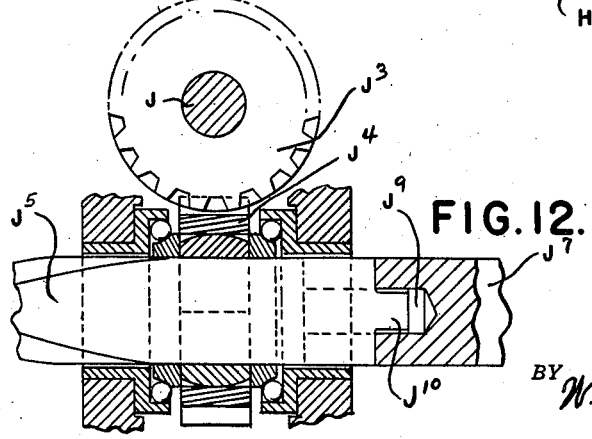
Figure 12 is a cross section on line 12—12 of Figure 10.

After unloading, as just described, the bearing segments are stacked in nested relation and removed from the machine by the following mechanism. The carriage E has pivotally attached thereto a forwardly extending arm O to the forward end of which is pivotally attached a member O' extending rearward therefrom. This member O' presents a pair of spaced rails $O^2$ (Figs. 2, 7 and 20) for receiving and supporting the bearing segment when disengaged from the latch hooks $N^{14}$ (Fig. 16). Such disengagement is effected by a finger $O^3$ (Fig. 7) on the member O, which just before completion of the return movement of the carriage engages a hook $N^{15}$ on the rear lever $N^{12}$ to swing said lever slightly on its pivot. An opposite swinging movement is simultaneously imparted to the forward lever $N^{12}$ through interengagement of arms $N^{16}$ and $N^{17}$ projecting laterally from said levers. Thus, the levers are sufficiently spread to disengage the hooks $N^{14}$ permitting the bearing segment to drop onto the rails $O^2$. The forward end of the member O' is provided with shoes $O^4$ (Fig. 20) which travel on parallel tracks $O^5$ on the frame A, said tracks terminating at their forward ends in downwardly curved cam portions $O^6$. A pair of weighted arms $O^7$ attached to and projecting forward from the member O on opposite sides thereof serve to hold the shoes upon the tracks $O^5$ and when these shoes pass onto the cam portion $O^6$ the member O will be tilted upward so that the bearing segment deposited thereon will slide forward and will be partially upended on a table extension of the frame $O^8$. A bifurcated lever $O^9$ pivotally mounted below the table extension $O^8$ and projecting upward through slots therein, serves to complete the up-ending of the bearing segment and to push the same forward into nested relation with the previously deposited segments. This lever is operated in its forward direction by the movement of the carriage E rearwardly and through the medium of a chain link connection $O^{10}$ (Fig. 11). A spring $O^{11}$ connected to a laterally extending arm $O^{12}$ on the lever serves to move it in the opposite direction.

Timing and control means

The timing of the carriage in its periods of movement and rest is effected by the mechanism previously described. It is, however, necessary to time the operation of the air cylinder and mechanism operated thereby in relation to the timing of the carriage which is accomplished as follows. Mounted at one end of the crank shaft $G^2$ is a third rotary cam P (Figs. 10 and 17) which actuates a push rod P' bearing against a rock arm $P^2$ on a rock-shaft $P^3$. This shaft is provided with an upwardly extending rock arm $P^4$ connected to a link $P^5$ for operating a lever arm $P^6$ on the air valve $P^7$. This valve which is of any suitable construction is connected with the air cylinder L and a source of air supply, so that in one position of the lever arm $P^6$ air will be admitted to the forward end of the cylinder and exhausted from the rear end thereof, while in another position of the lever, air is admitted to the rear end of the cylinder and exhausted from the forward end. The cam P is so fashioned that air will be admitted to the forward end of the cylinder L immediately after the operation of the loader. This will cause the operation of the clamping and leveling means (Figs. 5, 6, 24 and 25) while the carriage is still at rest. The reverse movement of the lever arm $P^6$ is accomplished by a lug $P^8$ on the carriage which near the completion of the forward movement of said carriage engages a hook $P^9$ on the link $P^5$. This disengages the core $L^{10}$ and through cooperation with the mechanism operated by the cam I' will displace said core member rearwardly out of the path of the unloading mechanism.

Cleaning of the bearing segments and die

To secure accuracy in the sizing of the bearing segments the surface which contacts the die must be free from any dust or particles of any character which might hold it out of position. Also, the surface of the die must be equally clean. The cleaning of the bearing segments is effected during transfer of the same by the loader, this being accomplished by an air jet Q (Figs. 2 and 22) so directed as to impinge against the outer convex surface of the segment during such travel. This performs the further function of holding this segment on the loader after the latter is in a position which might otherwise permit the segment to drop off. The jet is controlled by a valve Q', which is actuated by a cam $Q^2$ (Fig. 1) on the rock-shaft $K^5$. The die D is cleaned during the return movement of the carriage by an air jet $Q^3$ (Figs. 2 and 5), which is directed obliquely thereover, said jet being controlled by a valve $Q^4$ operated by a lug $Q^5$ on the carriage.

Cutter

Any suitable form of cutter may be employed for operating upon the edges of the bearing segments during the travel of the carriage E. As shown (Figs. 4 and 14), this comprises a pair of cutters R of the broach type having a succession of cutting edges, each taking a cut of predetermined depth, with a final finishing cut. These cutters are mounted on a cross head R' extending over the carriage being secured thereto by bolts $R^2$ passing through slots $R^3$, which latter provide for adjustment to suit bearing segments of different diameters.

Complete operation

Figure 29:
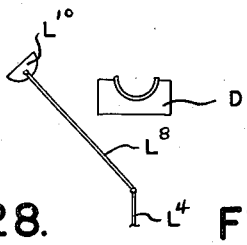

From the description above given, the complete function of the machine will be understood but briefly described, the sequence of operations is as follows. During the interval of rest of the carriage E, prior to the beginning of a cycle the core member $L^{10}$ (Figs. 22 and 23) and the leveling mechanism are both removed from the die member D. The loader C operated by the cam I, bell crank K, rack $K^3$, pinion $K^4$ and shaft $K^5$ (Figs. 7 and 13), then functions to swing the curved portion C' through an arcuate path, thereby picking up the lowermost bearing segment in the chute B and carrying it over into engagement with the die member D. During this movement the cam $Q^2$ on the rockshaft $K^5$ (Figs. 22 and 23) operates the valve Q' to blow air from the jet Q against the convex surface of the bearing segment, cleaning it from any dust or dirt, and also holding it in engagement with the portion C' until it is deposited in the die. The core member $L^{10}$ is next operated through the mechanism described, including the air cylinder L controlled by the cam P (Figs. 5 and 17) with the result that said core member is first swung over into registration with the die member D, and then drawn downward to clamp the bearing segment in said die (Fig. 24). However, this same movement of the core member actuates the leveling mechanism which functions to press the pads $M^4$ against the opposite edges of the deposited bearing segment, so as to level the same just prior to the clamping action (Figs. 6 and 25). Forward movement is then imparted to the carriage E during which the opposite edges of the bearing segment are trimmed by the cutters R (Figs. 5 and 26) and the segment is thus accurately sized. Just prior to the completion of the forward movement of the carriage the valve controlling the air cylinder L is reversed (Fig. 17), thereby raising the core member (Fig. 28) and through cooperation with the forked arm L¹⁹ swinging it rearward (Figs. 18 and 29). The unloader then functions to remove the sized bearing from the die D and to elevate the same (Figs. 30 and 31). Upon the return movement of the carriage the finger O³ (Figs. 4 and 7) engaging the pivoted hook lever N¹² of the unloader released the bearing segment therefrom so that it drops onto the spaced rails O² of the member O' (Fig. 31), and upon the succeeding forward movement of the carriage this member is tilted to up-end the bearing segment on the table O⁸ (Fig. 20). Finally, the bifurcated lever O⁹ functions to move this segment rearward, nesting the same with the previously deposited segments, so that the whole series is fed rearward. It will thus be understood that the whole operation is automatic from the time the unsized bearing segments are placed in the chute B to the arrangement of the sized segments in nested relation to each other.

It has been stated that great accuracy in the sizing of the bearing segments is obtained through the micrometer adjustment of the way E³ (Fig. 4) which determines the path of the carriage and consequently the spacing between the work holding die D and the cutters R. It is equally essential that the work holding die D should have its axis exactly parallel to the direction of movement of the carriage as otherwise one end of the bearing segment would be smaller than the other. To accomplish this I preferably mount the work holder D on a segmental cylindrical member S (Fig. 5) which in turn is adjustably mounted in a concave segmental cylindrical bearing S' in the carriage E. The axis of the segments S and S' extends perpendicular to the direction of movement of the carriage and is located in the longitudinal center of the die D. The member S is adjustably clamped to the carriage by screws S² and S³ threadedly secured in bearings S⁴ and engaging opposite ends of said member S. Thus by loosening one of the screws S² and S³ and tightening the other, the member S will be slightly rotated about its axis, which in turn will angularly adjust the axis of the work holding die D. It is, therefore, possible to adjust the die member D so that its axis is exactly parallel to the direction of movement of the carriage, which will insure that the bearing segments will be the same at both ends. The covers or shields L²⁷ slidably engage the links L⁸ and L⁹ and are held down upon the member S by springs S5

What I claim as my invention is:

1. In a machine of the character described, the combination with a frame, a carriage thereon and means for reciprocating said carriage with a period of rest at each end of its movement, of a work holder on said carriage, loading and unloading means located on said frame to respectively deposit work in and remove work from said holder during the periods of rest of said carriage while at opposite ends of its movement, work clamping means on said carriage movable out of registration with said work holder to clear the same for the loading and unloading operations, and means for operating said clamping means timed to clamp and release the work respectively subsequent to and in advance of the operations of said loading and unloading means.

2. In a machine of the character described, the combination with a frame and a carrier mounted for reciprocation thereon, of means for imparting reciprocating movement to said carriage with an interval of rest at each end thereof, comprising, a member mounted for rectilinear movement on said frame, said member being provided with aligned spaced track portions perpendicular to the direction of movement, a second member mounted for rotation on said first member and provided with an arcuate track portion intermediate and registering with said spaced track portions, a crank journaled in said frame having a traveling engagement with said track portions to impart reciprocatory movement to said members, said crank being of a radius corresponding to that of said arcuate track portion, and means operating during said reciprocatory movement for rotating said second member to arrange said arcuate track portions concentric with said crank at opposite ends of said movement, whereby said members will be held stationary while said crank is traversing said arcuate portions.

3. In a machine of the character described, the combination with a frame and a carrier mounted for reciprocation thereon, of means for imparting reciprocating movement to said carriage with an interval of rest at each end thereof comprising, a member mounted for rectilinear movement on said frame, said member being provided with aligned spaced track portions perpendicular to the direction of movement, a second member mounted for rotation on said first member and provided with an arcuate track portion intermediate and registering with said spaced track portions, a crank journaled in said frame having a traveling engagement with said track portions to impart reciprocatory movement to said members, said crank being of a radius corresponding to that of said arcuate track portion, means operating during said reciprocatory movement for rotating said second member to arrange said arcuate track portions concentric with said crank at opposite ends of said movement, whereby said members will be held stationary while said crank is traversing said arcuate portions, said means comprising a gear connected with said second member, an intermeshing gear having its axis perpendicular to the aforesaid gear, and a spirally twisted guide mounted on said frame and on which said second mentioned gear is slidably secured.

4. In a machine of the character described, the combination with a frame and a carrier mounted for reciprocation thereon, of means for imparting reciprocating movement to said carriage with an interval of rest at each end thereof comprising, a member mounted for rectilinear movement on said frame, said member being provided with aligned spaced track portions perpendicular to the direction of movement, a second member mounted for rotation on said first member and provided with an arcuate track portion intermediate and registering with said spaced track portions, a crank journaled in said frame having a traveling engagement with said track portions to impart reciprocatory movement to said members, said crank being of a radius corresponding to that of said arcuate track portion, means operating during said reciprocatory movement for rotating said second member to arrange said arcuate track portions concentric with said crank at opposite ends of said movement, whereby said members will be held stationary while said crank is traversing said arcuate portions, said means comprising a gear connected with said second member, an intermeshing gear having its axis perpendicular to the aforesaid gear, a spirally twisted guide mounted on said frame and on which said second mentioned gear is slidably secured, and means located on said frame at opposite ends of said rectilinear movement for locking said first and second mentioned members in rigid relation to each other.

5. In a machine of the character described, the combination with a frame and a carrier mounted for reciprocation thereon, of means for imparting reciprocating movement to said carriage with an interval of rest at each end thereof comprising, a member mounted for rectilinear movement on said frame, said member being provided with aligned spaced track portions perpendicular to the direction of movement, a second member mounted for rotation on said first member and provided with an arcuate track portion intermediate and registering with said spaced track portions, a crank journaled in said frame having a traveling engagement with said track portions to impart reciprocatory movement to said members, said crank being of a radius corresponding to that of said arcuate track portion, means operating during said reciprocatory movement for rotating said second member to arrange said arcuate track portions concentric with said crank at opposite ends of said movement, whereby said members will be held stationary while said crank is traversing said arcuate portions, said means comprising a gear connected with said second member, an intermeshing gear having its axis perpendicular to the aforesaid gear, a spirally twisted guide mounted on said frame and on which said second mentioned gear is slidably secured, and key members mounted on said frame for engaging substantially aligned recesses in said first and second mentioned members at the completion of the rectilinear movements thereon in opposite directions, said key members serving to move said track portions into exact registration and to rigidly hold the same in such position.

6. In a machine for sizing bearing segments, a work holder comprising a segmental cylindrical female die of a radius slightly less than that of the external surface of the segment to be sized, a segmental cylindrical core member for engaging the inner surface of said segment, automatic means for depositing an unsized segment in said die while said core member is out of registration therewith, means for moving said core member first into registration and then into clamping engagement with said segment, and means for engaging the portions of said segment projecting beyond said die and core member to level the same in advance of the final clamping.

7. In a machine for sizing bearing segments, the combination with a frame, a carriage thereon, and means for reciprocating said carriage with an interval of rest at one end of its movement, of a work holder mounted on said carriage comprising a segmental cylindrical female die, means operating when said carriage is at rest for depositing an unsized segment in said die, a segmental cylindrical core member for engaging the inner surface of said segment mounted on said carriage and out of registration with said die while said segment is deposited therein, means for moving said core member first into registration with said die and then into clamping engagement therewith, and means mounted on said frame operating subsequent to the registration but in advance of the clamping action of said core member for moving a leveling member over said core member and die to engage and level the projecting edge portions of said segment.

8. In a machine for sizing bearing segments, the combination with a frame, a carriage mounted thereon, and means for reciprocating said carriage with an interval of rest at one end of its movement, of a work holder mounted upon said carriage comprising a segmental cylindrical female die for receiving a bearing segment to be sized, a segmental cylindrical core member for engaging the inner surface of said segment, means for depositing an unsized segment in said die while said core member is out of registration therewith, means for moving said core member into registration and into clamping engagement with the segment in said die both operations occurring while said carriage is at rest at one end of its movement, and means mounted on said frame and actuated by the registering movement of said core member for moving a leveling member over said die and core member to engage and level the projecting edge portions of said segment, said operation being timed to occur just in advance of the clamping of the segment.

9. In a machine for sizing bearing segments, the combination with a frame, a carriage mounted thereon, and means for reciprocating said carriage with an interval of rest at each end of its movement, of a work holder mounted on said carriage and comprising a segmental cylindrical female die, a segmental cylindrical core member also mounted on said carriage, means for moving said core member from a position out of registration with said die into registration and clamping engagement therewith during the interval of rest while said carriage is at one end of its movement and for moving said core member out of the clamping engagement and out of registration with said die during the interval of rest at the opposite end of the movement of said carriage, loading means mounted on said frame for depositing an unsized bearing segment in said die in advance of the registration of the core member therewith, means on said frame for engaging the edge portions of said segment projecting above said die and core member to level the same in advance of the clamping of said segment, and means on said frame for unloading said segment from said die during the interval of rest of said carriage at the opposite end of its movement, said means operating subsequent to the movement of said core member out of registration with said die.

10. In a machine for sizing bearing segments, the combination with a frame, of a carriage thereon, means for reciprocating said carriage with an interval of rest at each end of its movement, a work holder and work clamping means mounted on said carriage, means for depositing an unsized bearing segment in said work holder and for clamping the same during the interval of rest at one end of the movement of the carriage, a cutter for sizing the segment during the movement of said carriage, means operating during the interval of rest at the opposite end of the movement of said carriage for unclamping said segment and for lifting the same out of engagement with said holder, a slideway on which said segment is deposited by said lifting means, means for tilting said slideway to discharge said segment and to partially up-end the same, and means operating in successive cycles for completing the up-ending of the segment and advancing the same into nested relation with the segments previously deposited.

11. In a machine for sizing bearing segments, a work holder comprising a segmental cylindrical female die, a chute for receiving the unsized bearings, a loader for transferring a bearing from said chute into said die, said loader having a segmental portion for engaging the inner surface of said segment, and means for projecting a jet of air against the outer surface of said segment during transfer to clean the same and to prevent disengagement from said loader.

12. In a machine for sizing bearing segments, the combination with a frame, a carriage thereon, means for reciprocating said carriage, a work holder mounted on said carriage comprising a segmental cylindrical female die, a loader for transferring an unsized bearing to said die, said loader having a segmental portion for engaging the inner surface of said segment, means for directing an air jet against said segment to clean and to hold the same against said loader during transfer, clamping means for the segment in said die, a cutter on said frame for operating upon the edge portions of said segment to size the same during the forward movement of the carriage, means for unloading the segment at the end of the forward movement of the carriage, and means for directing an air jet against said die member to clean the same during the return movement of said carriage.

13. In a machine of the character described, the combination with a frame, a carriage, means for reciprocating said carriage with an interval of rest at each end of its movement, a segmental cylindrical female die constituting a work holder mounted on said carriage, means for depositing work in said work holder and removing it therefrom operating respectively during the intervals of rest at opposite ends of the movement of the carriage, a segmental cylindrical core member for clamping the work in said holder, and means for operating said core member comprising a member mounted for vertical movement on said carriage, a pair of links secured to and depending from the opposite ends of said core member and pivotally attached at their lower ends to said vertically movable member, means for actuating said vertically movable member timed to raise the same at the completion of the forward movement of said carriage and to lower it at the completion of the return movement of said carriage, means for swinging said links and core member laterally out of registration with said die member after disengagement therefrom, and means for returning said core member into registration with said die during the downward movement of said vertically movable member.

14. In a machine of the character described, the combination with a frame, a carriage, means for reciprocating said carriage with an interval of rest at each end of its movement, a segmental cylindrical female die constituting a work holder mounted on said carriage, means for depositing work in said work holder and removing it therefrom operating respectively during the intervals of rest at opposite ends of the movement of the carriage, a segmental cylindrical core member for clamping the work in said holder, and means for operating said core member comprising a pneumatic motor mounted on said carriage, a rack actuated in a horizontal direction by said motor, a pair of spaced pinions in mesh with said rack, a pair of vertically movable racks in mesh with said pinions, a pair of links connected to the opposite ends of said core member and depending therefrom, the lower ends of said links being attached to said vertically movable racks, controlling means for said motor timed to raise said core member at the completion of the forward movement of said carriage and to lower it at the completion of the return movement of said carriage, means for swinging said links and core member laterally out of registration with said die member after disengagement therefrom, and means for returning said core member into registration with said die during the downward movement of said vertically movable member.

15. In a machine of the character described, the combination with a frame, a carriage thereon, and means for reciprocating said carriage with an interval of rest at each end of its movement, of a segmental cylindrical female die mounted on said carriage, means located at the opposite ends of the movement of said carriage for respectively depositing a bearing segment in said die and for removing it therefrom, and a segmental cylindrical core member for clamping said segmental bearing in said die, means for operating said core member to move the same from a position clearing said die into registration and clamping engagement therewith subsequent to the deposit of the bearing segment therein and for unclamping and moving said core out of registration with said die member prior to the removal of the bearing segment from the die, said core member remaining in the latter position during the return movement of the carriage, and leveling means for the bearing segment in said die comprising a member hinged to said frame and engaged by said core member at the completion of the return movement of the carriage, said leveling member being swung on its hinge by the movement of said core member into registration with said die, an arm pivotally mounted on said hinge member, and means actuated by the swinging of said hinged member for also swinging said arm to extend over said die and core member and to level said bearing segment prior to the clamping thereof.

16. In a machine of the character described, the combination with a frame, a carriage mounted for reciprocation thereon, a work holder on said carriage, work clamping means movable into and out of registration with said work holder and a loader operating when said clamping means is out of registration with said work holder, of work leveling means comprising a member hinged to said frame to swing transversely thereof, an arm hinged to said member to swing longitudinally of said frame, intermeshing beveled gear wheels secured to said arm and frame to be concentric respectively with the hinge axis thereof, resilient means for normally holding said hinged member and arm in a position to clear the path of movement of said loader and clamping means, and means engaged by the movement of said clamping means into registration with said work holder for swinging said hinged member and through the medium of said beveled gears simultaneously swinging said arm to level the work in said work holder in advance of the clamping of the same.

17. In a machine of the character described, the combination with a frame, a carriage thereon, means for reciprocating said carriage, and a cutting tool on said frame, of a work holder on said carriage including a segmental cylindrical female die member with its axis arranged in the vertical plane of movement of said carriage, a member for supporting said die member provided with a segmental cylindrical portion engaging a corresponding segmental cylindrical bearing on said carriage and with the common axis thereof perpendicular to and intersecting the axis of said die member substantially at the longitudinal center thereof, and means for rotatively adjusting said supporting member in said segmental cylindrical bearing to arrange the axis of said die member in exact parallelism to the direction of movement of said carriage.

18. In a machine of the character described, the combination with a work holder and a cutter, of means for intermittently relatively reciprocating the same with an interval of rest after each phase of the reciprocation, loading and unloading means for respectively depositing and removing work from said holder operating respectively during the intervals of rest after opposite phases of the reciprocation, clamping means for the work in said holder, and means for operating said clamping means timed to clamp and release the work respectively subsequent to and in advance of the operation of said loading and unloading means.

19. In a machine of the character described, the combination with a work holder and a cutter, of means for intermittently relatively reciprocating the same with an interval of rest after each phase of the reciprocation, loading and unloading means for respectively depositing and removing work from said holder operating respectively during the intervals of rest after opposite phases of the reciprocation, clamping means for the work in said holder movable into and out of registration with the latter, and means for operating said clamping means timed to move the same into registration and to clamp the work subsequent to the operation of said loading means, and to unclamp the work and to move out of registration in advance of the operation of said unloading means.

WILLIAM J. FIEGEL.